(12) United States Patent
Fujimoto

(10) Patent No.: US 11,955,007 B2
(45) Date of Patent: Apr. 9, 2024

(54) ROADSIDE APPARATUS AND TRAFFIC COMMUNICATION SYSTEM

(71) Applicant: KYOCERA Corporation, Kyoto (JP)

(72) Inventor: Shinobu Fujimoto, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 273 days.

(21) Appl. No.: 17/705,017

(22) Filed: Mar. 25, 2022

(65) Prior Publication Data
US 2022/0215752 A1 Jul. 7, 2022

Related U.S. Application Data

(63) Continuation of application No. PCT/JP2020/034890, filed on Sep. 15, 2020.

(30) Foreign Application Priority Data

Sep. 26, 2019 (JP) ................................. 2019-176220

(51) Int. Cl.
*G08G 1/0967* (2006.01)
*H01Q 1/02* (2006.01)
(Continued)

(52) U.S. Cl.
CPC ......... *G08G 1/096783* (2013.01); *H01Q 1/02* (2013.01); *H01Q 1/3225* (2013.01);
(Continued)

(58) Field of Classification Search
CPC ........... G08G 1/096783; G08G 1/0145; G08G 1/0116; H01Q 1/02; H01Q 1/3225;
(Continued)

(56) References Cited

U.S. PATENT DOCUMENTS 5,926,145 A 7/1999 Honma
6,549,774 B1 * 4/2003 Titlebaum .......... H04B 7/18534
455/272
(Continued)

FOREIGN PATENT DOCUMENTS

| JP | H10-041873 A | 2/1998 |
| JP | 2001-268625 A | 9/2001 |
| JP | 2004-328666 A | 11/2004 |

OTHER PUBLICATIONS

RSU-101E Specification, V2X Rodeside Comminication Unit, ETSI TC-ITS protocol Stack, the Internet <URL: https://file01.itaiwantrade.com/15b880a7-9f47-484f-aa3c-a185da334d1b/RSU-101E_datasheet.pdf>, searched on Sep. 20, 2019.

*Primary Examiner* — Daryl C Pope
(74) *Attorney, Agent, or Firm* — Studebaker & Brackett PC

(57) ABSTRACT

A roadside apparatus according to the first aspect includes: a housing including an antenna mounting surface; an antenna connection terminal being provided on the antenna mounting surface, and supporting both a rod antenna and a planar antenna; and a circuit being housed in the housing, and being configured to perform road-to-vehicle communication via a connection antenna connected to the antenna connection terminal. An area of the antenna mounting surface is equal to or larger than an area of the planar antenna. An antenna selected out of the planar antenna and the rod antenna is connected as the connection antenna to the antenna connection terminal.

13 Claims, 20 Drawing Sheets

(51) Int. Cl.
  *H01Q 1/32*    (2006.01)
  *H01Q 9/22*    (2006.01)
  *H01Q 13/08*   (2006.01)
  *H01Q 21/28*   (2006.01)
  *H04W 4/44*    (2018.01)

(52) U.S. Cl.
  CPC ............... *H01Q 9/22* (2013.01); *H01Q 13/08* (2013.01); *H01Q 21/28* (2013.01); *H04W 4/44* (2018.02)

(58) Field of Classification Search
  CPC .......... H01Q 9/22; H01Q 13/08; H01Q 21/28; H01Q 1/246; H01Q 3/2611; H01Q 9/0407; H01Q 9/32; H04W 4/44
  See application file for complete search history.

(56) References Cited

U.S. PATENT DOCUMENTS

| | | | |
|---|---|---|---|
| 6,943,739 B1* | 9/2005 | Rousu | H04B 17/15 |
| | | | 343/702 |
| 10,476,134 B2* | 11/2019 | Anguera Pros | H01Q 21/30 |
| 2002/0002045 A1 | 1/2002 | Aoki et al. | |
| 2005/0206570 A1* | 9/2005 | Rousu | H04B 17/15 |
| | | | 343/702 |
| 2013/0065530 A1* | 3/2013 | Gansen | H04L 12/66 |
| | | | 455/41.2 |

* cited by examiner

ROADSIDE APPARATUS AND TRAFFIC COMMUNICATION SYSTEM

RELATED APPLICATIONS

The present application is a continuation based on PCT Application No. PCT/JP2020/034890, filed on Sep. 15, 2020, which claims the benefit of Japanese Patent Application No. 2019-176220 filed on Sep. 26, 2019. The content of which is incorporated by reference herein in their entirety.

TECHNICAL FIELD

The present disclosure relates to a roadside apparatus and a traffic communication system.

BACKGROUND ART

In recent years, as a technology that can reduce the occurrence of traffic accidents, intelligent transport systems (ITS) have been attracting attention. For such intelligent transport systems, a roadside apparatus being a base station provided near a road is used.

NPL 1 describes a roadside apparatus including a rod antenna. In the roadside apparatus, two antenna connection terminals are provided on an upper surface being the top surface of a housing in an installation state in which the roadside apparatus is installed. The rod antenna (rod antenna) is connected to each antenna connection terminal, and road-to-vehicle communication being communication between the roadside apparatus and a vehicle is performed via the rod antenna.

CITATION LIST

Non Patent Literature

NPL 1: RSU-101E_datasheet, [online], [searched on Sep. 20, 20191, the Internet <URL: https://file01.itaiwantrade.com/15b880a7-9f47-484f-aa3c-a185da334d1b/RSU-101E_datasheet.pdf>

SUMMARY OF INVENTION

A roadside apparatus according to the first aspect includes: a housing including an antenna mounting surface; an antenna connection terminal being provided on the antenna mounting surface, and supporting both a rod antenna and a planar antenna; and a circuit being housed in the housing, and being configured to perform road-to-vehicle communication via a connection antenna connected to the antenna connection terminal. An area of the antenna mounting surface is equal to or larger than an area of the planar antenna. An antenna selected out of the planar antenna and the rod antenna is connected, as the connection antenna, to the antenna connection terminal.

A traffic communication system according to the second aspect includes: the roadside apparatus according to the first aspect; and an in-vehicle device configured to perform road-to-vehicle communication with the roadside apparatus.

DESCRIPTION OF EMBODIMENTS

In general, a rod antenna has characteristics in that it has no directivity or low directivity. Such a roadside apparatus is referred to as an omnidirectional roadside apparatus. It is considered that the omnidirectional roadside apparatus is installed at an intersection where two or more roads cross, for example, and is used for the purpose of performing road-to-vehicle communication with a vehicle on each of the two or more roads.

Meanwhile, for the purpose of performing road-to-vehicle communication with a vehicle on a specific road at an intersection, it is desirable that an antenna having high directivity, for example, a patch antenna (planar antenna), be provided in a roadside apparatus. Such a roadside apparatus is referred to as a directional roadside apparatus.

However, a conventional roadside apparatus has low versatility, and accordingly an omnidirectional roadside apparatus and a directional roadside apparatus need to be separately manufactured and provided depending on a road environment in which the roadside apparatus is installed and the purpose of the roadside apparatus.

In view of this, the present disclosure has an object to provide a roadside apparatus and a traffic communication system having high versatility that can be adapted to various road environments and purposes.

A traffic communication system according to an embodiment will be described with reference to the drawings. Note that, in the following description regarding the drawings, the same or similar parts are denoted by the same or similar reference signs.

Configuration of Traffic Communication System

Figure 1:
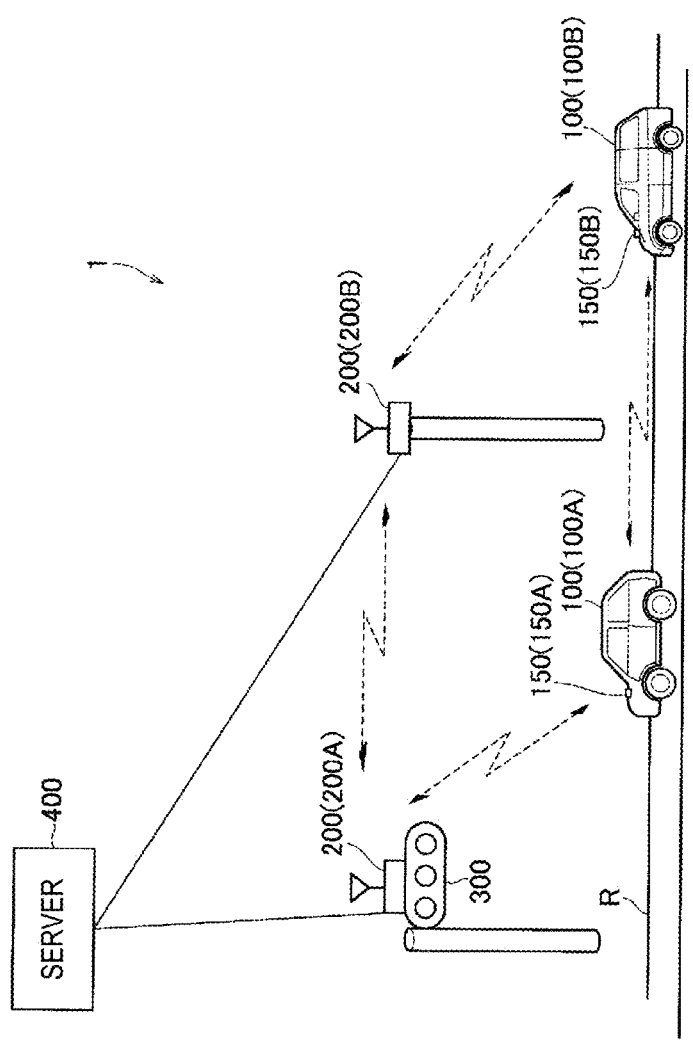
FIG. 1 is a diagram illustrating a configuration of a traffic communication system according to an embodiment.

First, a configuration of a traffic communication system according to an embodiment will be described. FIG. 1 is a diagram illustrating a configuration of a traffic communication system 1 according to an embodiment.

As illustrated in FIG. 1, the traffic communication system 1 includes a vehicle 100 that passes through on a road R, and a roadside apparatus 200 being a base station installed on a roadside of the road R. "The vehicle 100 passes through" includes a state in which the vehicle 100 travels (moves) and a state in which the vehicle 100 temporarily stops.

In FIG. 1, vehicles 100A and 100B are illustrated as the vehicle 100, and roadside apparatuses 200A and 200B are illustrated as the roadside apparatus 200. Note that although an automobile such as a standard-sized automobile and a light automobile is illustrated as the vehicle 100, a vehicle that travels on the road R may suffice, and for example, a two-wheel motor vehicle (motorcycle) or the like may suffice as well.

Each vehicle 100 is equipped with an in-vehicle device 150 being a mobile station that performs wireless communication. The in-vehicle device 150 performs road-to-vehicle communication with the roadside apparatus 200. FIG. 1 illustrates an example in which an in-vehicle device 150A and the roadside apparatus 200A perform road-to-vehicle communication, and an in-vehicle device 150B and the roadside apparatus 200B perform road-to-vehicle communication.

The roadside apparatus 200 is installed near the road R. The roadside apparatus 200 may be installed at an intersection where two or more roads cross.

The roadside apparatus 200 may perform road-to-road communication with another roadside apparatus 200. FIG. 1 illustrates an example in which the roadside apparatus 200A and the roadside apparatus 200B perform road-to-road communication by means of wireless communication; however, the road-to-road communication may be wired communication.

In the example illustrated in FIG. 1, the roadside apparatus 200A is installed at a traffic light (traffic signal) 300 or a support for the traffic light 300, and operates in corporation with the traffic light 300. For example, the roadside apparatus 200A transmits a radio signal including signal information related to the traffic light 300 to the vehicle 100 (in-vehicle device 150). For such road-to-vehicle communication, broadcast wireless communication in which communication is performed for a large number of unspecified endpoints may be used. Alternatively, for the road-to-vehicle communication, multicast wireless communication in which communication is performed for a large number of specified endpoints may be used, or unicast wireless communication in which communication is performed for a single specified endpoint may be used.

Each roadside apparatus 200 is connected to a server 400 via a communication channel. The communication channel may be a wired channel, or may be a wireless channel. A vehicle detector installed at the roadside may be connected to the server 400 via the communication channel. From each roadside apparatus 200, the server 400 receives information that the roadside apparatus 200 receives from the in-vehicle device 150, such as a position and a vehicle speed of the vehicle 100. The server 400 may further receive vehicle detection information from a roadside sensor installed on the road R. The server 400 collects and processes various pieces of traffic information, based on the received information, and thereby manages road traffic.

Schematic Configuration of Roadside Apparatus

Figure 2:
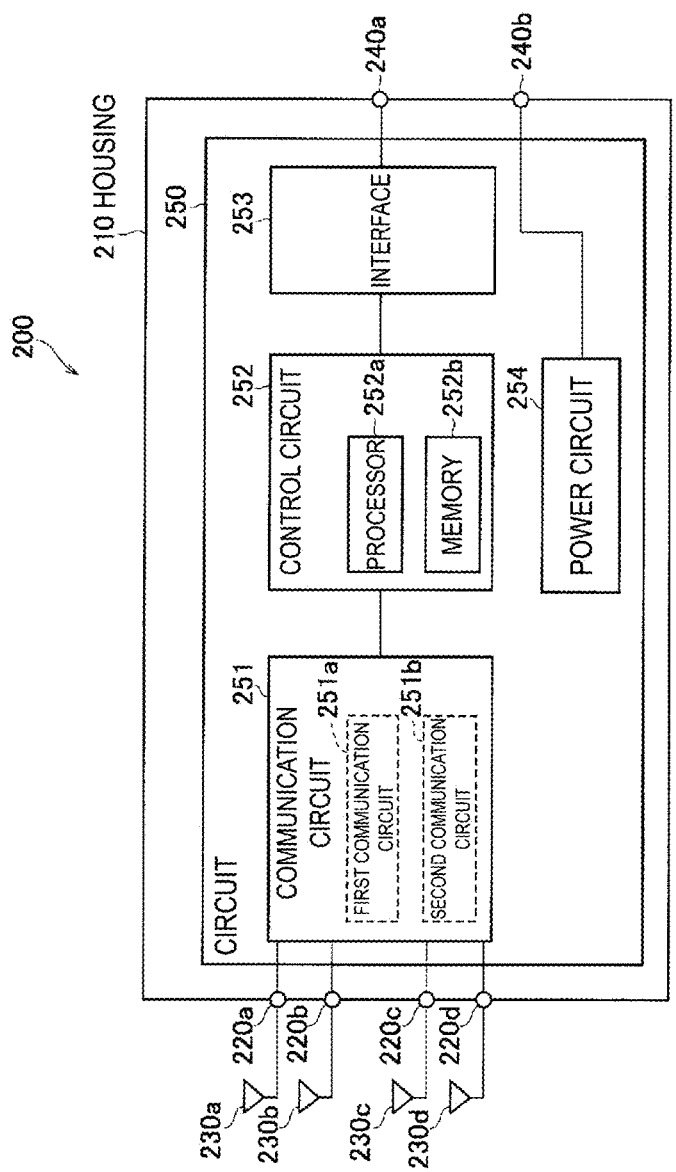
FIG. 2 is a block diagram illustrating a schematic configuration of a roadside apparatus according to an embodiment.

Next, schematic configurations of the roadside apparatus 200 according to an embodiment will be described. FIG. 2 is a block diagram illustrating a schematic configuration of the roadside apparatus 200 according to an embodiment.

As illustrated in FIG. 2, the roadside apparatus 200 includes a housing 210, a plurality of antenna connection terminals 220 (220a to 220d), a plurality of connection antennas 230 (230a to 230d), a plurality of external connection terminals 240 (240a and 240b), and a circuit 250. The embodiment will mainly describe an example in which the number of antenna connection terminals 220 is four. However, the number of antenna connection terminals 220 may be three or less, or may be five or more.

The housing 210 is a box-like exterior structure that houses the circuit 250 and includes a frame. The housing 210 includes antenna mounting surfaces 211 and an installation surface 212 (not illustrated in FIG. 2; see FIG. 4 and FIG. 5).

Each of the antenna connection terminals 220a to 220d is electrically connected to the circuit 250. In the description below, when the antenna connection terminals 220a to 220d are not particularly distinguished from each other, the antenna connection terminals 220a to 220d are simply referred to as the antenna connection terminals 220. The antenna connection terminals 220 are provided on the antenna mounting surfaces 211. An antenna can be mounted to or removed from each antenna connection terminal 220. Specifically, each antenna connection terminal 220 supports antennas of both of rod antennas 232 (see FIG. 4) and planar antennas 231 (see FIG. 5).

In general, the rod antenna 232 has characteristics in that it has no directivity or low directivity. The rod antenna 232 may be referred to as a rod antenna. In contrast, the planar antenna 231 has characteristics in that it has high directivity. The planar antenna 231 may be referred to as a patch antenna.

Figure 3A:
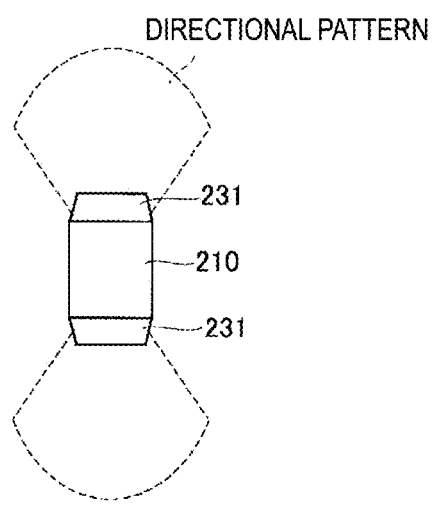
FIG. 3A is a diagram illustrating a directional pattern of planar antennas according to an embodiment.
Figure 3B:
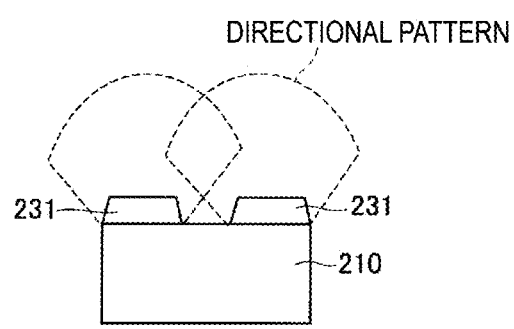
FIG. 3B is a diagram illustrating a directional pattern of the planar antennas according to an embodiment.

FIGS. 3A and 3B are each a diagram illustrating a directional pattern of the planar antennas 231 according to an embodiment. As illustrated in FIGS. 3A and 3B, the planar antenna 231 has high directivity with respect to a direction perpendicular to an antenna surface.

In the example illustrated in FIG. 3A, among two planar antennas 231, one planar antenna 231 is provided on one surface of the housing 210, and the other planar antenna 231 is provided on the opposite surface of the housing 210. In this manner, by arranging the directivities of the two planar antennas 231 in directions opposite to each other, the diversity effect can be achieved.

In the example illustrated in FIG. 3B, two planar antennas 231 are provided on one surface of the housing 210. In this manner, by arranging the directivities of the two planar antennas 231 in the same direction, a composite gain can be achieved.

As illustrated in FIG. 2, the connection antennas 230a to 230d are directly connected to the antenna connection terminals 220a to 220d, respectively. In the description below, when the connection antennas 230a to 230d are not particularly distinguished from each other, the connection antennas 230a to 230d are simply referred to as the connection antennas 230. The type of the connection antennas 230 is either the rod antennas 232 or the planar antennas 231.

The following will mainly describe an example in which the connection antennas 230 are antennas of the same type. Note that a part of the connection antennas 230 may be the rod antennas 232, and the rest of the connection antennas 230 may be the planar antennas 231.

The external connection terminals 240a and 240b are electrically connected to the circuit 250. In the description below, when the external connection terminals 240a and 240b are not particularly distinguished from each other, the external connection terminals 240a and 240b are simply referred to as the external connection terminals 240. The external connection terminals 240 are provided on the installation surface 212.

Specifically, the external connection terminal 240a is a terminal for transmitting and receiving data to and from the outside. There may be a plurality of external connection terminals 240a. The external connection terminal 240b is a terminal for receiving power supply from the outside.

The circuit 250 includes various circuits and circuit boards housed in the housing 210. The circuit 250 performs road-to-vehicle communication via the connection antennas 230 connected to the antenna connection terminals 220. The circuit 250 may further perform road-to-road communication via the connection antennas 230. The circuit 250 includes a communication circuit 251, a control circuit 252, an interface 253, and a power circuit 254.

The communication circuit 251 performs wireless communication (that is, road-to-vehicle communication) with the in-vehicle device 150 provided in the vehicle 100. The communication circuit 251 may further perform road-to-road communication via the connection antennas 230.

The communication circuit 251 converts a radio signal received by the connection antennas 230 into reception data, and outputs the reception data to the control circuit 252. Further, the communication circuit 251 converts transmission data output by the control circuit 252 into a radio signal, and transmits the radio signal from the connection antennas 230.

A wireless communication scheme of the communication circuit 251 may be a scheme in conformity to the standard of T109 of the Association of Radio Industries and Businesses (ARIB), a scheme in conformity to the standard of vehicle-to-everything (V2X) of the Third Generation Partnership Project (3GPP), and/or a scheme in conformity to the standard of a wireless local area network (LAN) such as the Institute of Electrical and Electronics Engineers (IEEE) 802.11 series. The communication circuit 251 may be configured to be capable of conforming to all of these communication standards.

The communication circuit 251 may support a plurality of frequency bands. The communication circuit 251 may include a first communication circuit 251a supporting a first frequency band, and a second communication circuit 251b supporting a second frequency band different from the first frequency band. The first frequency band and the second frequency band may be frequency bands of wireless communication schemes different from each other. For example, the first frequency band may be a frequency band in conformity to the standard of T109, and the second frequency band may be a frequency band in conformity to the standard of V2X.

The control circuit 252 controls various functions of the roadside apparatus 200. The control circuit 252 includes at least one memory 252b, and at least one processor 252a electrically connected to the memory 252b. The memory 252b includes a volatile memory and a non-volatile memory, and stores information used for processing in the processor 252a and programs to be executed by the processor 252a. The memory 252b corresponds to a storage. The processor 252a performs various types of processing by executing the programs stored in the memory 252b.

The interface 253 is an interface for wired communication with an external apparatus. The interface 253 is electrically connected to the external connection terminal 240a. The interface 253 may perform communication with the server 400, another roadside apparatus 200, the traffic light 300, and/or a roadside camera via the external connection terminal 240a.

The power circuit 254 converts a power voltage supplied from the external apparatus via the external connection terminal 240b, and outputs the converted power voltage to each circuit.

Detailed Configuration of Roadside Apparatus

Next, detailed configurations of the roadside apparatus 200 according to an embodiment will be described.

Figure 4:
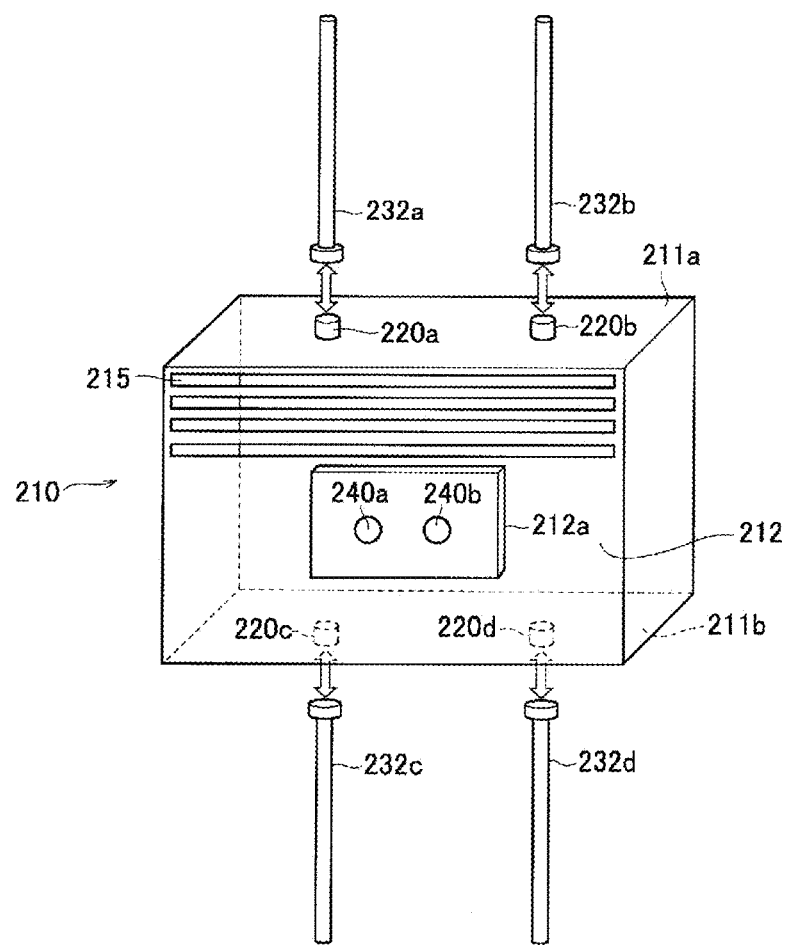
FIG. 4 is a perspective view of a housing seen from an installation surface side regarding the roadside apparatus to which rod antennas are connected according to an embodiment.
Figure 5:
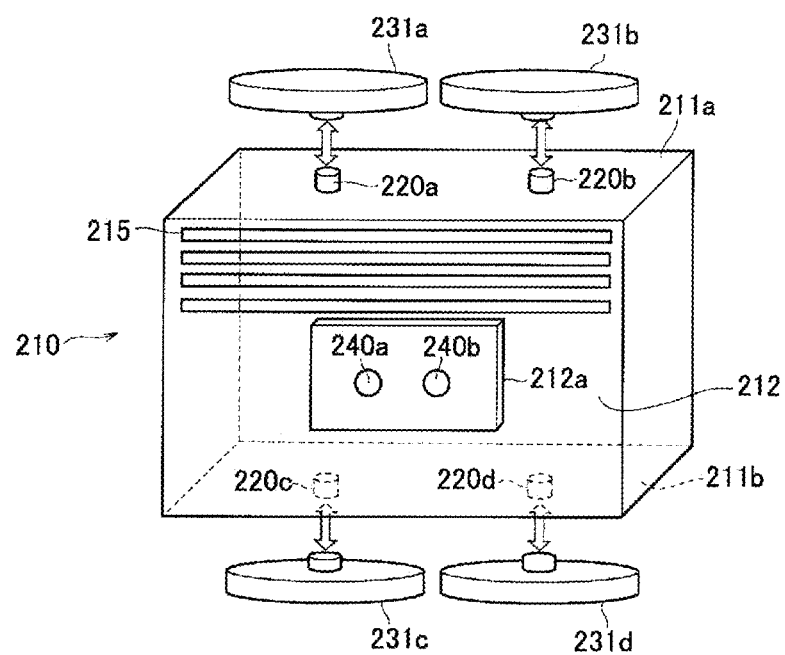
FIG. 5 is a perspective view of the housing seen from the installation surface side regarding the roadside apparatus to which the planar antennas are connected according to an embodiment.
Figure 6:
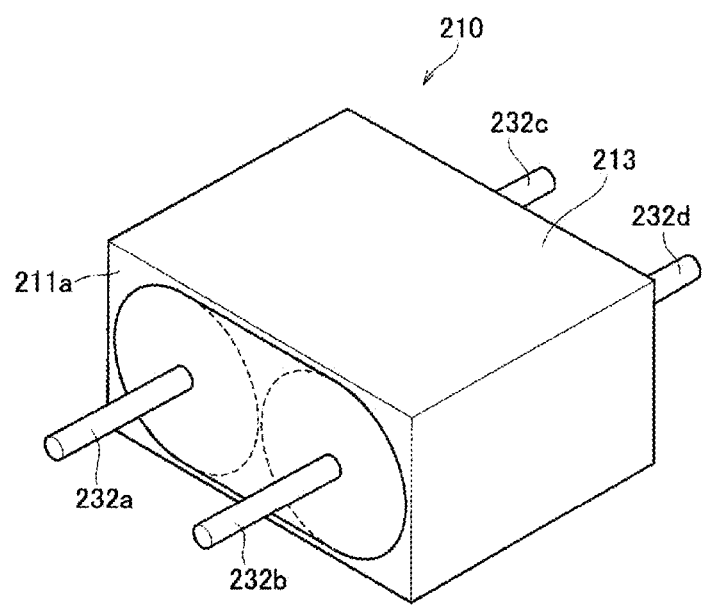
FIG. 6 is a perspective view of the housing seen from a front surface side regarding the roadside apparatus to which the rod antennas are connected according to an embodiment.
Figure 7:
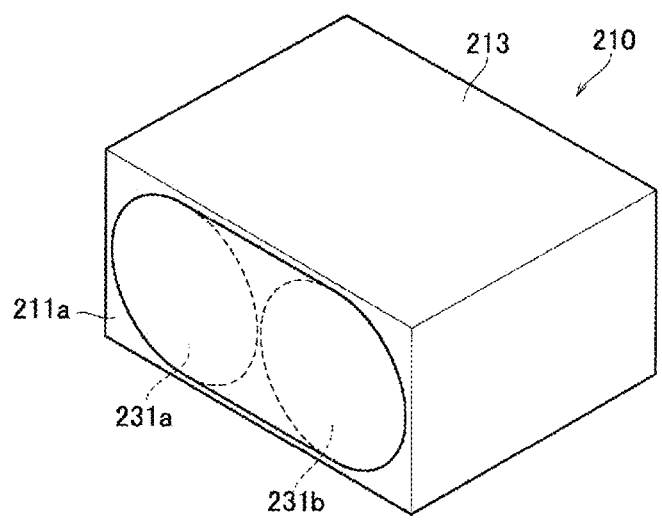
FIG. 7 is a perspective view of the housing seen from the front surface side regarding the roadside apparatus to which the planar antennas are connected according to an embodiment.

FIG. 4 is a perspective view of the housing 210 seen from the installation surface 212 side regarding the roadside apparatus 200 to which the rod antennas 232 are connected. FIG. 5 is a perspective view of the housing 210 seen from the installation surface 212 side regarding the roadside apparatus 200 to which the planar antennas 231 are connected. FIG. 6 is a perspective view of the housing 210 seen from a front surface 213 side regarding the roadside apparatus 200 to which the rod antennas 232 are connected. FIG. 7 is a perspective view of the housing 210 seen from the front surface 213 side regarding the roadside apparatus 200 to which the planar antennas 231 are connected. The front surface 213 is the opposite surface of the installation surface 212.

As illustrated in FIGS. 4 and 5, the roadside apparatus 200 includes the housing 210 including the antenna mounting surface 211, and the antenna connection terminals 220 that are provided on the antenna mounting surfaces 211 and support antennas of both of the rod antennas 232 and the planar antennas 231. The area of the antenna mounting surface 211 is as large as or larger than the area of the planar antenna 231. Antennas selected among the planar antennas 231 and the rod antennas 232 are connected as the connection antennas 230 to the antenna connection terminals 220.

As described above, the area of the antenna mounting surface 211 is larger than the area of the planar antenna 231, and antennas selected among the planar antennas 231 and the rod antennas 232 are connected to the antenna connection terminals 220. Therefore, one roadside apparatus 200 can be used on several occasions depending on its purpose, for example, as the directional roadside apparatus and the omnidirectional roadside apparatus. As a result, the roadside apparatus 200 having high versatility that can be adapted to various road environments and purposes can be provided.

The housing 210 of the roadside apparatus 200 includes a plurality of antenna mounting surfaces 211 that are not coplanar, and the antenna connection terminals 220 are provided on each of the plurality of antenna mounting surfaces 211. By connecting the antennas to each antenna mounting surface 211 in this manner, the diversity effect can be achieved.

Further, as illustrated in FIG. 5, when the planar antennas 231 are provided on each of the plurality of antenna mounting surfaces 211, the directivities of the planar antennas 231 can be arranged in various directions. This allows for adaptation to various road environments and purposes.

Note that the number of antenna mounting surfaces 211 provided in the housing 210 may be one, or may be three or more.

A plurality of antenna connection terminals 220 are provided on each of the plurality of antenna mounting surfaces 211. FIGS. 4 and 5 illustrate examples in which two antenna connection terminals 220a and 220b are provided on an antenna mounting surface 211a, and two antenna connection terminals 220c and 220d are provided on an antenna mounting surface 211b. Note that the number of antenna connection terminals 220 provided in each antenna mounting surface 211 may be one, or may be three or more.

By providing a plurality of antenna connection terminals 220 in each of the plurality of antenna mounting surfaces 211, a plurality of antennas can be connected to each antenna mounting surface 211. Therefore, a composite gain can be enhanced.

In the example illustrated in FIG. 4, four rod antennas 232a to 232d are connected to four antenna connection terminals 220a to 220d. The extension direction of each rod antenna 232 is perpendicular to the antenna mounting surface 211.

In contrast, in the example illustrated in FIG. 5, four planar antennas 231a to 231d are connected to four antenna connection terminals 220a to 220d. FIG. 5 illustrates an example in which the planar shape of each planar antenna 231 is a circle. However, the planar shape of each planar antenna 231 may be a rectangle.

The intervals of the antenna connection terminals 220 in the same antenna mounting surface 211 are set such that two planar antennas 231 can be provided on the same antenna mounting surface 211. Further, the area of each antenna mounting surface 211 is as large as or larger than the total area of the two planar antennas 231 (see FIG. 7).

The housing 210 further includes the installation surface 212 being a surface different from the plurality of antenna mounting surfaces 211. The installation surface 212 is a surface facing a supporter that supports the roadside apparatus 200 in an installation state in which the roadside apparatus 200 is installed. Here, the supporter is, for example, a support 601 or an arm 602 (see FIG. 8, for example).

The external connection terminals 240 (240a and 240b) electrically connected to the circuit 250 are provided on the installation surface 212. Specifically, an external connector 212a including the external connection terminals 240 is provided in a part of the region of the installation surface 212.

By providing the external connection terminals 240 on the installation surface 212 being a surface different from the antenna mounting surface 211, the external connection terminals 240 need not be provided on the plurality of antenna mounting surfaces 211, and the planar antennas 231 can be more easily provided on the plurality of antenna mounting surfaces 211. In other words, the area of each of the plurality of antenna mounting surfaces 211 can be reduced, and thus the housing 210 can be downsized.

In an embodiment, the housing 210 includes an antenna mounting surface 211a (first antenna mounting surface), and an antenna mounting surface 211b (second antenna mounting surface) located on the opposite side of the antenna mounting surface 211a. First antenna connection terminals 220 (antenna connection terminals 220a and 220b) are provided on the antenna mounting surface 211a. Second antenna connection terminals 220 (antenna connection terminals 220c and 220d) are provided on the antenna mounting surface 211b.

In this manner, a distance between the connection antennas 230 of the first antenna connection terminals 220 (antenna connection terminals 220a and 220b) and the connection antennas 230 of the second antenna connection terminals 220 (antenna connection terminals 220c and 220d) can be increased.

Therefore, correlation between antennas can be lowered, and the diversity effect can thus be enhanced. Further, as illustrated in FIG. 5, when each connection antenna 230 is the planar antenna 231, directivities can be arranged in directions opposite from each other.

The housing 210 further includes a heat sink 215 provided on a surface different from the plurality of antenna mounting surfaces 211. In this manner, the heat sink 215 need not be provided on the plurality of antenna mounting surfaces 211, and the planar antennas 231 can be more easily provided on the plurality of antenna mounting surfaces 211. In other words, the area of each of the plurality of antenna mounting surfaces 211 can be reduced, and thus the housing 210 can be downsized.

Specifically, the heat sink 215 is provided at least on the installation surface 212. In the examples illustrated FIGS. 6 and 7, the heat sink 215 is not provided on the front surface 213 side of the housing 210. When the heat sink 215 is provided on the installation surface 212, the heat sink 215 can be made less noticeable to people, and the aesthetic of the roadside apparatus 200 can thus be enhanced.

Note that FIGS. 4 and 5 illustrate examples in which the heat sink 215 is provided only in a part of the region of the installation surface 212. However, the heat sink 215 may be entirely provided in a region of the installation surface 212 other than that of the external connector 212a.

Installation Example of Roadside Apparatus

Next, installation examples of the roadside apparatus 200 according to an embodiment will be described.

Figure 8:
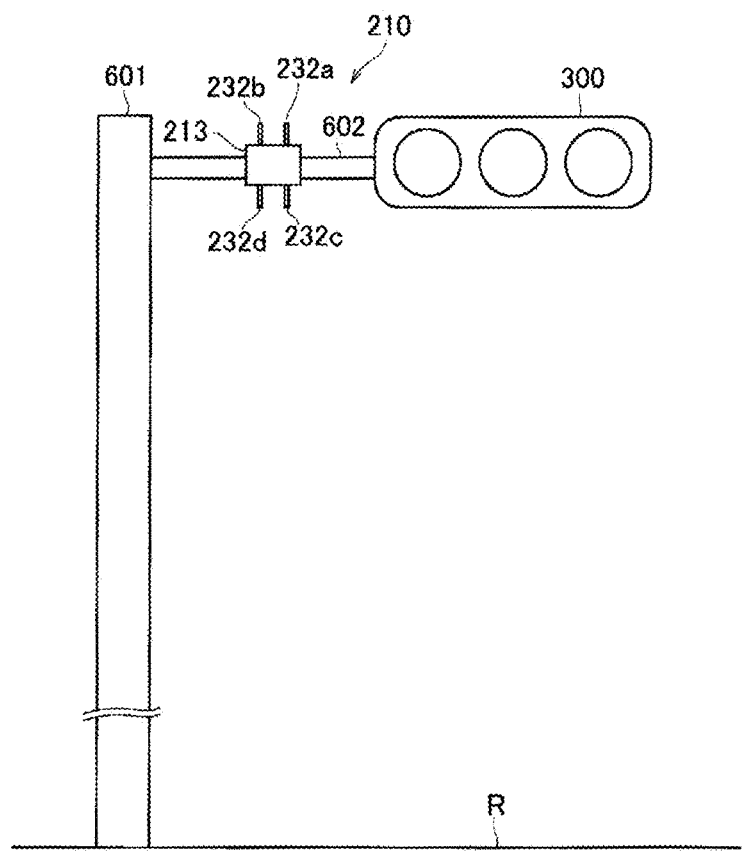
FIG. 8 is a diagram illustrating an installation example of the roadside apparatus regarding the roadside apparatus to which the rod antennas are connected according to an embodiment.
Figure 9:
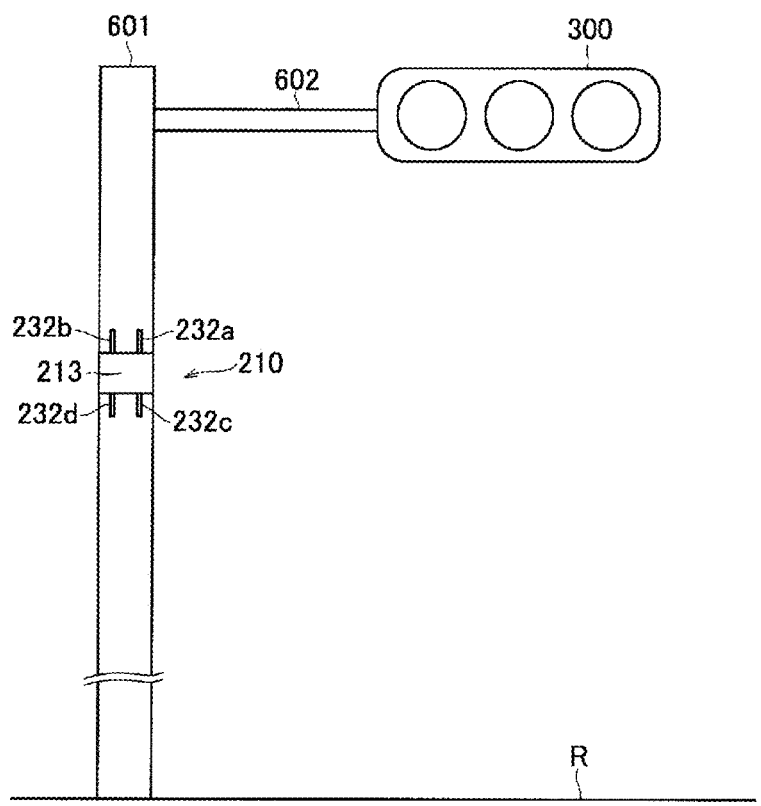
FIG. 9 is a diagram illustrating an installation example of the roadside apparatus regarding the roadside apparatus to which the rod antennas are connected according to an embodiment.

FIGS. 8 and 9 are each a diagram illustrating an installation example of the roadside apparatus 200 regarding the roadside apparatus 200 to which the rod antennas 232 are connected.

As illustrated in FIGS. 8 and 9, the roadside apparatus 200 is installed near the traffic light 300 supported by the support 601 and the arm 602. In the example illustrated in FIG. 8, the roadside apparatus 200 is installed in the arm 602. In the example illustrated in FIG. 9, the roadside apparatus 200 is installed in the support 601.

When the rod antennas 232 are connected to the antenna connection terminals 220, the roadside apparatus 200 is installed in a state in which the antenna mounting surface 211 is substantially parallel to a road surface of the road R. In other words, the roadside apparatus 200 is installed in a state in which the installation surface 212 and the front surface 213 are substantially perpendicular to the road surface of the road R. In this manner, the extension direction of each rod antenna 232 is also substantially perpendicular to the road surface of the road R.

By installing the roadside apparatus 200 in this manner, the directivity can be arranged uniformly in directions parallel to the road surface, for example, the horizontal direction.

Figure 10:
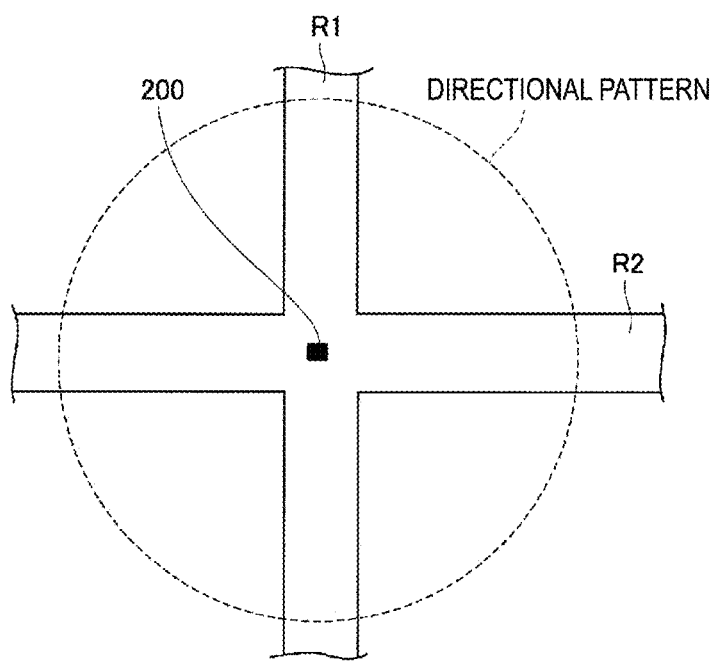
FIG. 10 is a diagram illustrating a directional pattern of the roadside apparatus when the roadside apparatus to which the rod antennas are connected is installed at an intersection according to an embodiment.

FIG. 10 is a diagram illustrating a directional pattern of the roadside apparatus 200 when the roadside apparatus 200 to which the rod antennas 232 are connected is installed at an intersection.

As illustrated in FIG. 10, when the roadside apparatus 200 to which the rod antennas 232 are connected is installed at an intersection, the directional pattern of the roadside apparatus 200 covers the vicinity of the intersection, allowing the roadside apparatus 200 to perform road-to-vehicle communication with the vehicle 100 on each of the roads R1 and R2.

Figure 11:
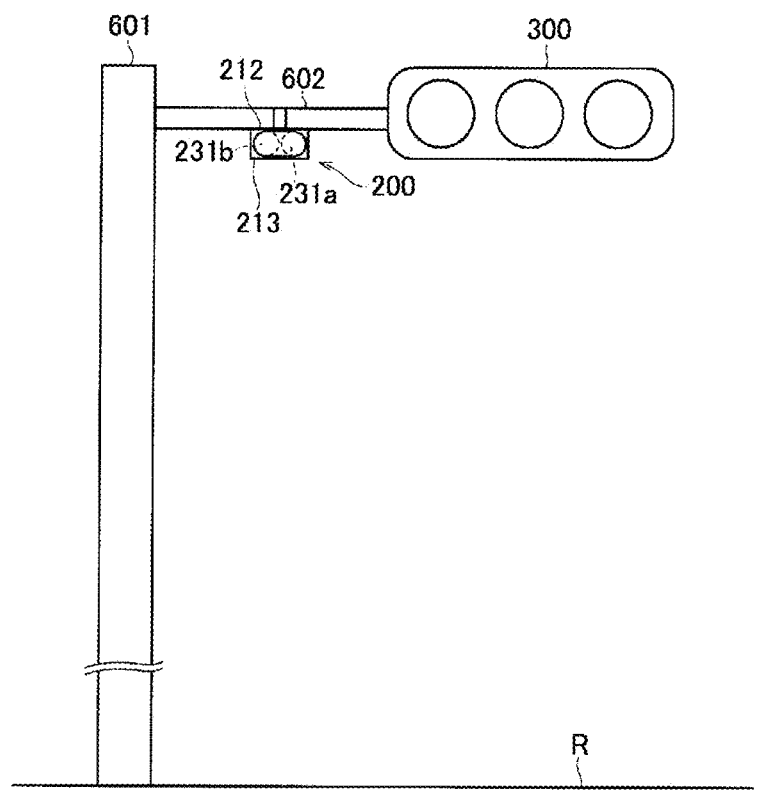
FIG. 11 is a diagram illustrating an installation example of the roadside apparatus regarding the roadside apparatus to which the planar antennas are connected according to an embodiment.

FIG. 11 is a diagram illustrating an installation example of the roadside apparatus 200 regarding the roadside apparatus 200 to which the planar antennas 231 are connected.

As illustrated in FIG. 11, the roadside apparatus 200 is installed near the traffic light 300 supported by the support 601 and the arm 602. In the example illustrated in FIG. 11, the roadside apparatus 200 is installed at the lower side of the arm 602.

When the planar antennas 231 are connected to the antenna connection terminals 220, the roadside apparatus 200 is installed in a state in which the antenna mounting surface 211 is substantially perpendicular to the road surface of the road R. In other words, the roadside apparatus 200 is installed in a state in which the installation surface 212 and the front surface 213 are substantially parallel to the road surface of the road R. In the example illustrated in FIG. 11, the front surface 213 faces the road surface.

By installing the roadside apparatus 200 in this manner, the high directivity of the planar antennas 231 can be arranged in directions parallel to the road surface, for example, the horizontal direction.

Figure 12:
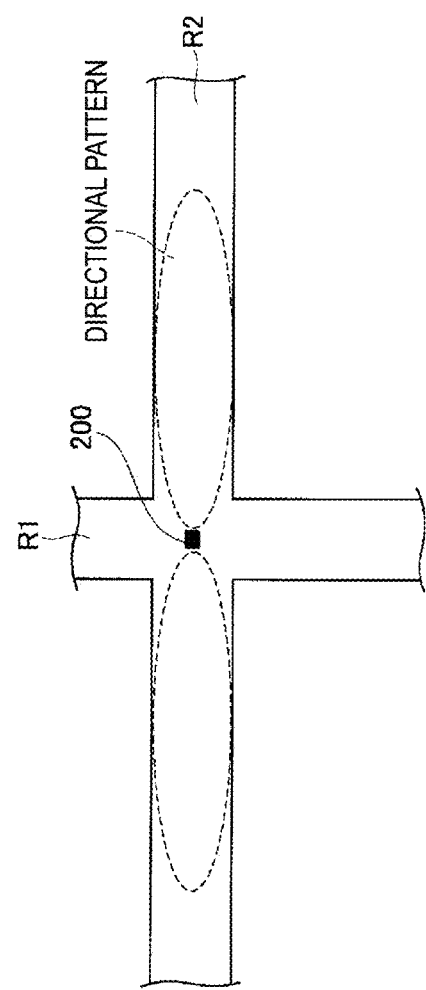
FIG. 12 is a diagram illustrating a directional pattern of the roadside apparatus when the roadside apparatus to which the planar antennas are connected is installed at an intersection according to an embodiment.

FIG. 12 is a diagram illustrating a directional pattern of the roadside apparatus 200 when the roadside apparatus 200 to which the planar antennas 231 are connected is installed at an intersection.

As illustrated in FIG. 12, when the roadside apparatus 200 to which the planar antennas 231 are connected is installed at an intersection such that the directivity of the roadside apparatus 200 is arranged in a direction of a specific road (the road R2 in the example illustrated in FIG. 12), the radio waves can be prevented from being transmitted to a road (the road R1 in the example illustrated in FIG. 12) that is not to be communicated with.

Outer Appearance Configuration Example of Roadside Apparatus

Next, outer appearance configuration examples of the roadside apparatus 200 according to an embodiment will be described.

Figure 13A:
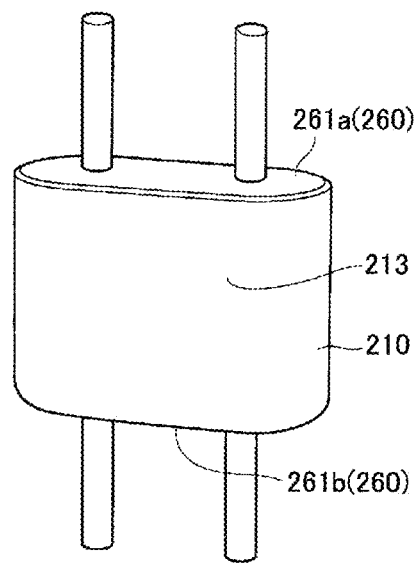
FIG. 13A is a diagram illustrating outer appearance configuration example 1 of the roadside apparatus according to an embodiment.
Figure 13B:
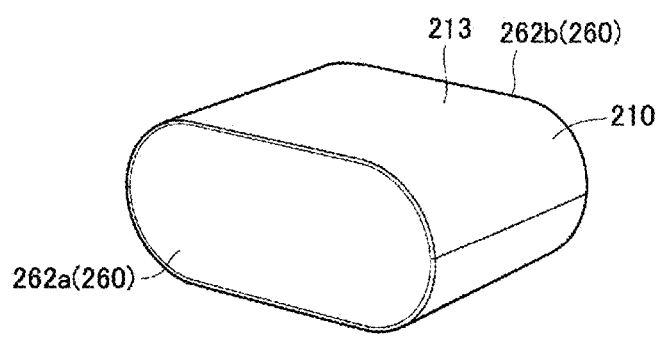
FIG. 13B is a diagram illustrating outer appearance configuration example 1 of the roadside apparatus according to an embodiment.

FIGS. 13A and 13B are each a diagram illustrating outer appearance configuration example 1 of the roadside apparatus 200 according to an embodiment. FIG. 13A is a perspective view of the roadside apparatus 200 regarding the roadside apparatus 200 to which the rod antennas 232 are connected. FIG. 13B is a perspective view of the roadside apparatus 200 regarding the roadside apparatus 200 to which the planar antennas 231 are connected.

As illustrated in FIGS. 13A and 13B, in outer appearance configuration example 1, surfaces of the housing 210 of the roadside apparatus 200 other than the antenna mounting surfaces 211, the installation surface 212, and the front surface 213 are curved.

Further, the housing 210 of the roadside apparatus 200 includes a lid 260 that entirely covers the antenna mounting surfaces 211 provided with the connection antennas 230 and the like.

When the rod antennas 232 are connected as the connection antennas 230 to the antenna connection terminals 220, as illustrated in FIG. 13A, lids 261a, b (260) including protrusions according to the shape of the rod antennas 232 are mounted to the housing 210. The lid 261a provided for the antenna mounting surface 211a includes two protrusions for two rod antennas 232, and covers the antenna mounting surface 211a and the two rod antennas 232. The lid 261b provided for the antenna mounting surface 211b also includes two protrusions for two rod antennas 232, and covers the antenna mounting surface 211b and the two rod antennas 232. In contrast, when the planar antennas 231 are connected as the connection antennas 230 to the antenna connection terminals 220, as illustrated in FIG. 13B, plate-like lids 262a, b (260) are mounted to the housing 210. The lids 262a, b cover the antenna mounting surfaces 211a, b and the planar antennas 231.

Owing to such a lid 260, the antenna connection terminals 220 and the connection antennas 230 can be protected. Further, when the planar antennas 231 are connected to the antenna connection terminals 220, the plate-like lid 260 is mounted to the housing 210. Therefore, the whole roadside apparatus 200 can be downsized, and the aesthetic of the roadside apparatus 200 can be enhanced with the shape thereof being simplified.

Figure 14A:
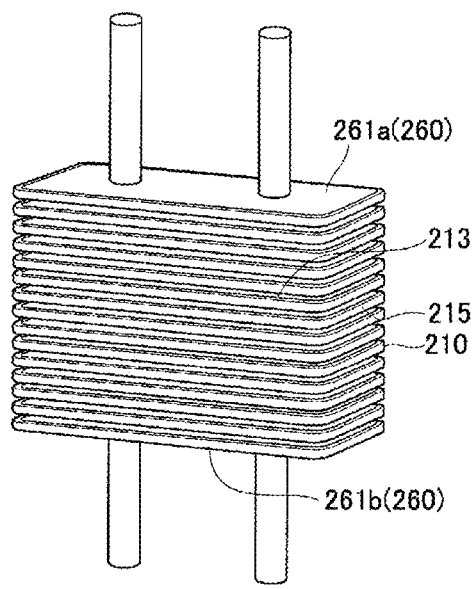
FIG. 14A is a diagram illustrating outer appearance configuration example 2 of the roadside apparatus according to an embodiment.
Figure 14B:
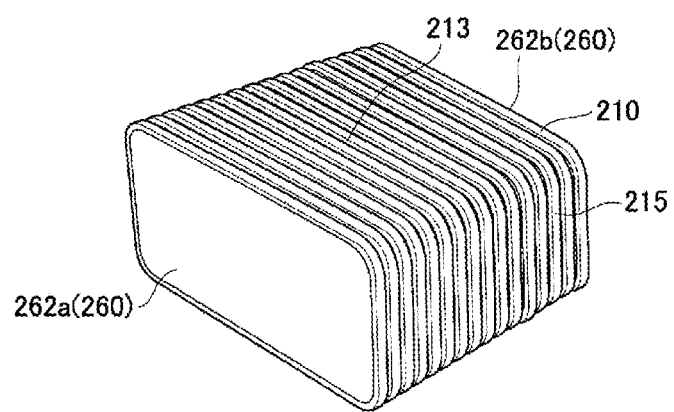
FIG. 14B is a diagram illustrating outer appearance configuration example 2 of the roadside apparatus according to an embodiment.

FIGS. 14A and 14B are each a diagram illustrating outer appearance configuration example 2 of the roadside apparatus 200 according to an embodiment. FIG. 14A is a perspective view of the roadside apparatus 200 regarding the roadside apparatus 200 to which the rod antennas 232 are connected. FIG. 14B is a perspective view of the roadside apparatus 200 regarding the roadside apparatus 200 to which the planar antennas 231 are connected.

As illustrated in FIGS. 14A and 14B, in outer appearance configuration example 2, in the housing 210 of the roadside apparatus 200, the heat sink 215 is entirely provided on surfaces other than the antenna mounting surfaces 211 In this manner, heat dissipation performance of the roadside apparatus 200 can be enhanced. Note that the housing 210 of the roadside apparatus 200 includes a lid 260 that covers the antenna mounting surfaces 211 provided with the connection antennas 230 and the like.

When the rod antennas 232 are connected as the connection antennas 230 to the antenna connection terminals 220, as illustrated in 14A, lids 261a, b (260) including protrusions according to the shape of the rod antennas 232 are mounted to the housing 210. The lid 261a provided for the antenna mounting surface 211a includes two protrusions for two rod antennas 232, and covers the antenna mounting surface 211a and the two rod antennas 232. The lid 261b provided for the antenna mounting surface 211b also includes two protrusions for two rod antennas 232, and covers the antenna mounting surface 211b and the two rod antennas 232. In contrast, when the planar antennas 231 are connected to the antenna connection terminals 220, as illustrated in FIG. 14B, the plate-like lids 262a, b (260) are mounted to the housing 210. The lids 262a, b cover the antenna mounting surfaces 211a, b and the planar antennas 231.

Figure 15A:
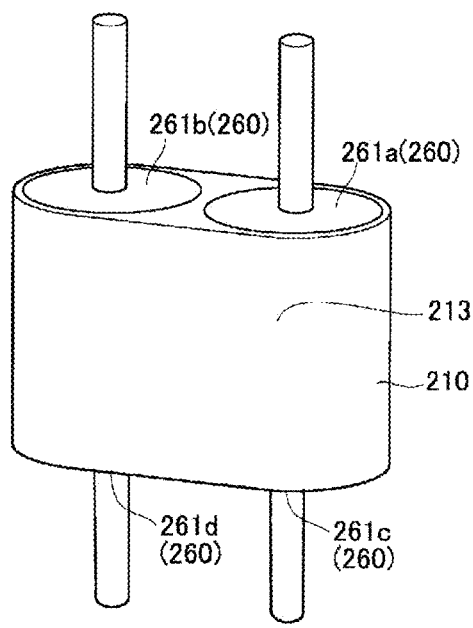
FIG. 15A is a diagram illustrating outer appearance configuration example 3 of the roadside apparatus according to an embodiment.
Figure 15B:
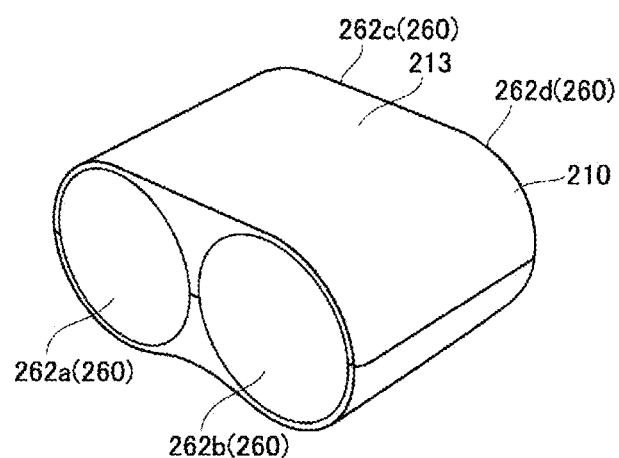
FIG. 15B is a diagram illustrating outer appearance configuration example 3 of the roadside apparatus according to an embodiment.

FIGS. 15A and 15B are each a diagram illustrating outer appearance configuration example 3 of the roadside apparatus 200 according to an embodiment. FIG. 15A is a perspective view of the roadside apparatus 200 regarding the roadside apparatus 200 to which the rod antennas 232 are connected. FIG. 15B is a perspective view of the roadside apparatus 200 regarding the roadside apparatus 200 to which the planar antennas 231 are connected.

As illustrated in FIGS. 15A and 15B, in outer appearance configuration example 3, the housing 210 of the roadside apparatus 200 includes a lid 260 that covers the antenna mounting surfaces 211 provided with the connection antennas 230 and the like, and four lids 260 provided for four antenna connection terminals 220 (four connection antennas 230). Each lid 260 has a circular planar shape.

When the rod antennas 232 are connected to the antenna connection terminals 220, as illustrated in FIG. 15A, lids 261a, b are provided for the rod antennas 232. The lids 261a, b each includes a protrusion for the rod antenna 232, and covers the antenna mounting surface 211a and the rod antenna 232. Lids 261c, d are provided for the opposite rod antennas 232. The lids 261c, d each include a protrusion for the rod antenna 232, and cover the antenna mounting surface 211b and the rod antenna 232. In contrast, when the planar antennas 231 are connected to the antenna connection terminals 220, as illustrated in FIG. 15B, plate-like lids 262a, b (260) are mounted to the housing 210, and the lids 262a, b cover the antenna mounting surface 211a and the planar antennas 231. Further, plate-like lids 262c, d (260) are mounted to the housing 210, and the lids 262c, d cover the antenna mounting surface 211b and the planar antennas 231.

Other Embodiments

The control circuit 252 may perform adaptive array control of dynamically changing directivity by using the plurality of connection antennas 230 connected to the plurality of antenna connection terminals 220. In particular, the control circuit 252 may perform the adaptive array control when each connection antenna 230 is the rod antenna 232. The adaptive array control includes at least one of beamforming, in which directivity (beam) is arranged in a direction of arrival of a desired wave, and null steering, in which nulls of directivity are arranged in a direction of arrival of an interference wave. By dynamically changing the directivity in this manner, communication quality of road-to-vehicle communication can be enhanced.

The housing 210 of the roadside apparatus 200 may include three or more antenna mounting surfaces 211. For example, all of the surfaces other than the installation surfaces 212 and the front surface 213 may be the antenna mounting surfaces 211.

The roadside apparatus 200 may support a plurality of frequency bands. Specifically, among the plurality of connection antennas 230 connected to the plurality of antenna connection terminals 220, a part of the connection antennas 230 may be antennas for the first frequency band, and the rest of the connection antennas 230 may be antennas for the second frequency band different from the first frequency.

As illustrated in FIG. 2, the circuit 250 includes the first communication circuit that is electrically connected to the part of the connection antennas 230 and supports the first frequency band, and the second communication circuit that is electrically connected to the rest of the connection antennas 230 and supports the second frequency band. In this manner, the frequency bands of both of the first frequency band and the second frequency band can be supported, and versatility of the roadside apparatus 200 can thus be enhanced.

Figure 16:
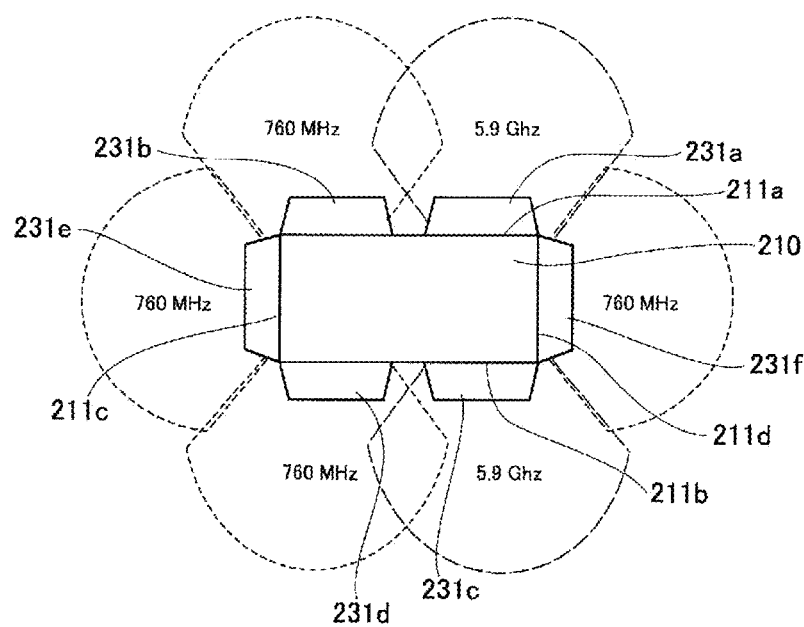
FIG. 16 is a diagram illustrating the roadside apparatus according to another embodiment.

FIG. 16 is a diagram illustrating the roadside apparatus 200 according to another embodiment. As illustrated in FIG. 16, in the housing 210 of the roadside apparatus 200, four surfaces other than the installation surfaces 212 and the front surface 213 are antenna mounting surfaces 211a to 211d. Planar antennas 231a and 231b are provided on the antenna mounting surface 211a, planar antennas 231c and 231d are provided on the antenna mounting surface 211b, a planar antenna 231e is provided on the antenna mounting surface 211c, and a planar antenna 231f is provided on the antenna mounting surface 211d.

Further, the roadside apparatus 200 supports the frequency bands of both of the first frequency band (for example, 760 MHz) and the second frequency band (for example, 5.9 GHz). FIG. 16 illustrates an example in which the connection antennas 230 are the planar antennas 231. Among the plurality of planar antennas 231a to 231f, a part of the planar antennas 231 (231b, 231d, 231e, and 231f) are antennas for the first frequency band, and the rest of the planar antennas 231 (231a and 231c) are antennas for the second frequency band.

A program causing a computer to execute each of the processes performed by the in-vehicle device 150 or the roadside apparatus 200 may be provided. The program may be recorded in a computer-readable medium. Use of the computer-readable medium enables the program to be installed on a computer. Here, the computer-readable medium on which the program is recorded may be a non-transitory recording medium. The non-transitory recording medium is not particularly limited and may be, for example, a recording medium such as a CD-ROM or a DVD-ROM.

In addition, circuits for executing the processes to be performed by the in-vehicle device 150 or the roadside apparatus 200 may be integrated, and at least part of the in-vehicle device 150 or the roadside apparatus 200 may be configured as a semiconductor integrated circuit (a chipset or an SoC).

Embodiments have been described above in detail with reference to the drawings, but specific configurations are not limited to those described above, and various design modifications can be made without departing from the gist of the present disclosure.

The invention claimed is:

1. A roadside apparatus comprising:
a housing including an antenna mounting surface;
an antenna connection terminal being provided on the antenna mounting surface, and supporting both a rod antenna and a planar antenna; and
a circuit being housed in the housing, and being configured to perform road-to-vehicle communication via a connection antenna connected to the antenna connection terminal, wherein
an area of the antenna mounting surface is equal to or larger than an area of the planar antenna, and
an antenna selected out of the planar antenna and the rod antenna is connected, as the connection antenna, to the antenna connection terminal.

2. The roadside apparatus according to claim 1, wherein the housing is configured to include a plurality of antenna mounting surfaces being not coplanar with each other, and the antenna connection terminal is provided on each of the plurality of antenna mounting surfaces.

3. The roadside apparatus according to claim 2, wherein a plurality of the antenna connection terminals are provided on each of the plurality of antenna mounting surfaces.

4. The roadside apparatus according to claim 2, wherein the housing further is configured to include an installation surface being a surface different from the plurality of antenna mounting surfaces, and
an external connection terminal electrically connected to the circuit is provided on the installation surface.

5. The roadside apparatus according to claim 2, wherein the housing further is configured to include a heat sink provided on a surface different from the plurality of antenna mounting surfaces.

6. The roadside apparatus according to claim 4, wherein in an installation state in which the roadside apparatus is installed, the installation surface faces a supporter configured to support the roadside apparatus,
the housing further includes a heat sink provided on a surface different from the plurality of antenna mounting surfaces, and
the heat sink is provided at least on the installation surface.

7. The roadside apparatus according to claim 2, wherein among a plurality of the connection antennas connected to a plurality of the antenna connection terminals provided on the plurality of antenna mounting surfaces, a part of the plurality of the connection antennas are antennas for a first frequency band, and a rest of the plurality of the connection antennas are antennas for a second frequency band different from the first frequency band, and
the circuit includes
a first communication circuit being electrically connected to the part of the plurality of the connection antennas, and supporting the first frequency band, and
a second communication circuit being electrically connected to the rest of the plurality of the connection antennas, and supporting the second frequency band.

8. The roadside apparatus according to claim 2, wherein the circuit is configured to include a control circuit, and the control circuit is configured to perform adaptive array control of dynamically changing directivity by using a plurality of the connection antennas connected to a plurality of the antenna connection terminals provided on the plurality of antenna mounting surfaces.

9. The roadside apparatus according to claim 2, wherein the plurality of antenna mounting surfaces are configured to include
a first antenna mounting surface provided with a first antenna connection terminal, and
a second antenna mounting surface provided with a second antenna connection terminal, the second antenna mounting surface being on an opposite side of the first antenna mounting surface.

10. The roadside apparatus according to claim 9, wherein when the rod antenna is connected to each of the first and second antenna connection terminals, the roadside apparatus is installed near a road in a state in which the first and second antenna mounting surfaces are substantially parallel to a road surface of the road.

11. The roadside apparatus according to claim 9, wherein when the planar antenna is connected to each of the first and second antenna connection terminals, the roadside apparatus is installed near a road in a state in which the first and second antenna mounting surfaces are substantially perpendicular to a road surface of the road.

12. The roadside apparatus according to claim 1, further comprising
a lid covering the antenna mounting surface from above, wherein
when the rod antenna is connected to the antenna connection terminal, the lid including a protrusion according to a shape of the rod antenna is mounted on the housing, and
when the planar antenna is connected to the antenna connection terminal, the lid having a plate-like shape is mounted on the housing.

13. A traffic communication system comprising:
the roadside apparatus according to claim 1; and
an in-vehicle device configured to perform road-to-vehicle communication with the roadside apparatus.

* * * * *